March 3, 1959 — M. J. PURETIC — 2,875,547
ADJUSTABLE AND REMOVABLE SUPPORT
Filed April 7, 1958 — 2 Sheets-Sheet 1
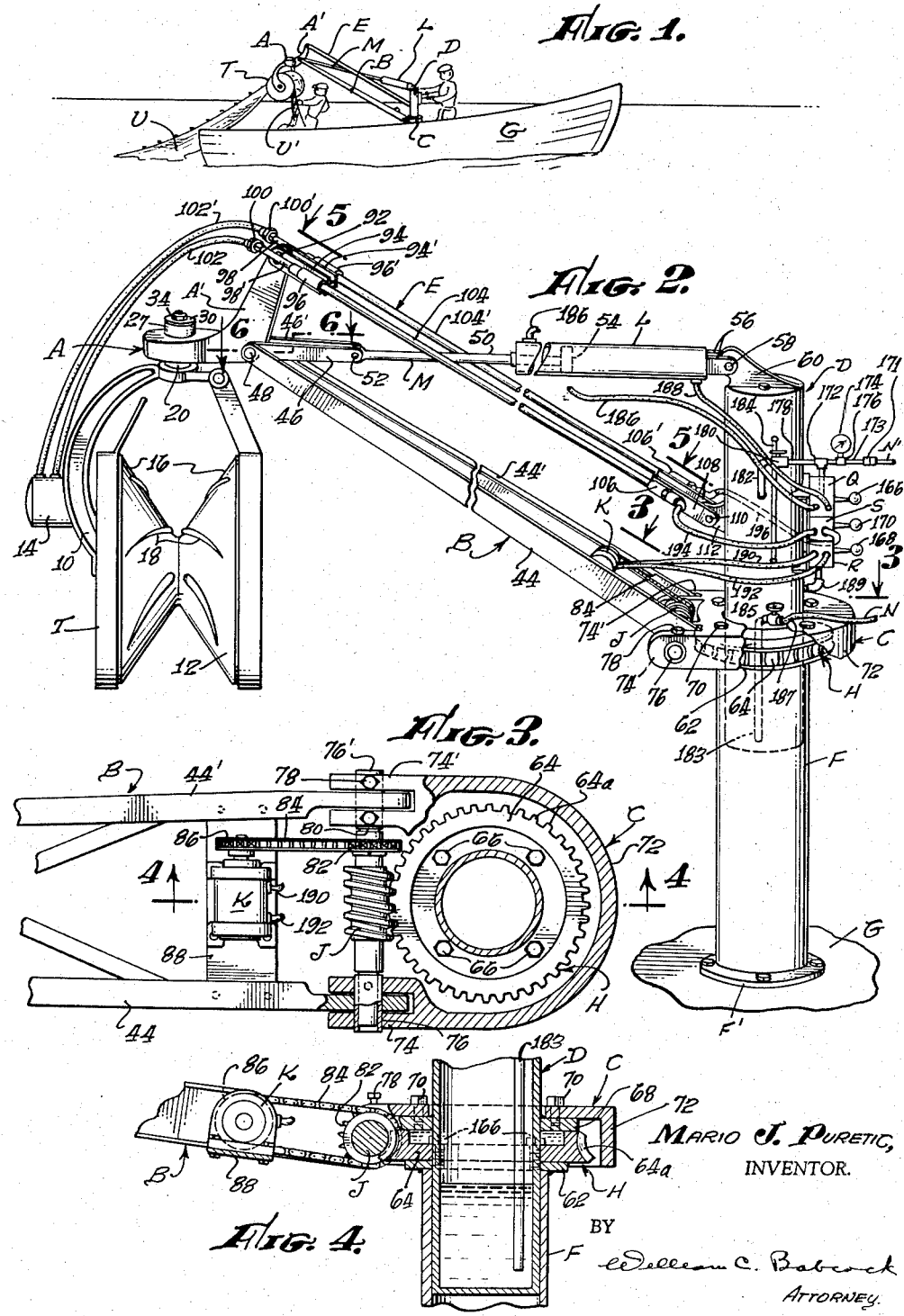
MARIO J. PURETIC, INVENTOR.
BY William C. Babcock
ATTORNEY.

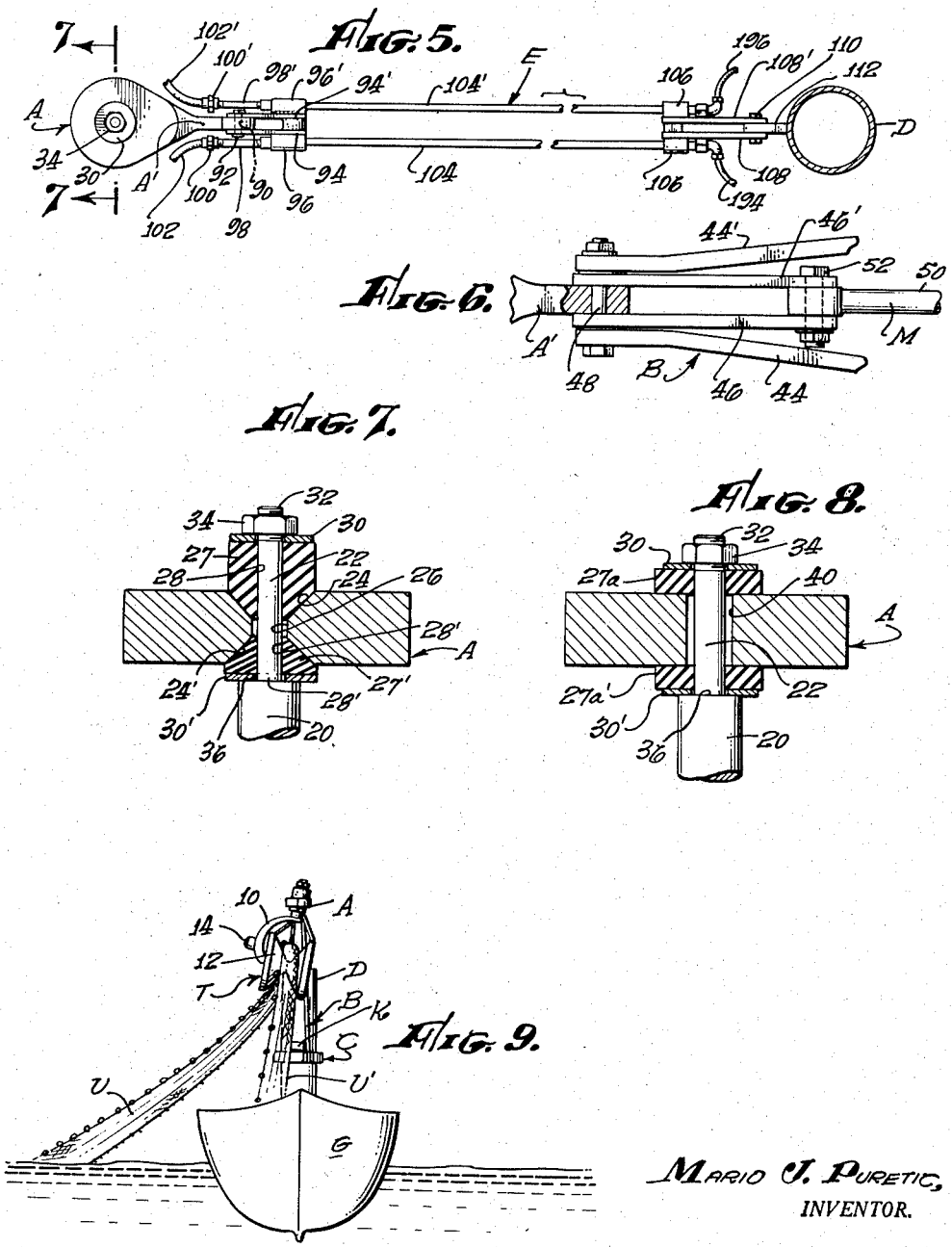

United States Patent Office 2,875,547
Patented Mar. 3, 1959

2,875,547

ADJUSTABLE AND REMOVABLE SUPPORT

Mario J. Puretic, Torrance, Calif.

Application April 7, 1958, Serial No. 726,660

10 Claims. (Cl. 43—8)

The present invention relates generally to commercial fishing equipment, and more particularly to a power-actuated adjustable support that is especially adapted to hold a net or long line retrieving device at a desired elevated position in an open boat. This application is a continuation-in-part of my copending application Serial No. 643,654 filed March 4, 1957, and entitled Power Operated Net Retrieving Device and Adjustable Elevated Support Therefor, now abandoned.

During recent years in commercial fishing, long lines and nets have been drawn aboard the fishing vessel by power operated blocks installed on the vessel, and by means of which the line or net so retrieved from the sea may be stacked in a desired configuration aboardship. However, a problem is encountered when it is desired to use these power blocks with an open boat where there is little or no superstructure sufficiently rigid and strong to support such a power operated block at an elevated position. In many parts of the world commercial fishing is carried out in small open boats but a portion of the year, and when not in use these boats are stored on the beach or open docks until required the following season. The weathering to which these inactive boats are subjected is not particularly detrimental thereto, but it would be highly detrimental to a power block unit or other mechanical equipment should it be so exposed to the elements during the time these small boats are not in use.

A primary object of the present invention is to provide a vertically adjustable support which can be moved 360° in a horizontal plane, but one that can be removably mounted in an open boat without the use of tools. This last mentioned operational advantage is of the utmost importance for it makes it possible to easily and quickly ready a boat for support of a net retrieving device at the beginning of a fishing season, but also permits the support and net retrieving device with all the hydraulic appurtenances forming a part thereof to be removed from the vessel at the end of the season for convenient storage as a unit in a protective shed, warehouse, or the like until again needed.

Another object of the invention is to supply an elevated mounting for a power operated net or long line retrieving device that restrains the device against sway or lateral movement thereof when the vessel on which it is installed encounters rough seas whereby safety of the crew is assured against any sudden movement of the device.

A further object of the invention is to provide an adjustable support wherein a jib is provided that at all times remains in position parallel to the boat deck as the support is raised and lowered, which jib rotatably dependingly supports the net retrieving device therefrom.

Yet another object of the invention is to furnish an adjustable support for a power operated long line or net retrieving device that can be easily used and controlled by a single operator, is of simple mechanical structure, can be fabricated from standard, commercially available materials, is positive in operation, and requires a minimum of maintenance attention.

Yet another object of the nivention is to furnish a supporting device, which due to its small and compact size, presents little or no interference in normal fishing operations.

Still another object of the invention is to provide a power operated, elevated support whereby the main power requirements of a vessel and the operating costs thereof can be materially reduced and at the same time increase the overall operational efficiency of the boat on which the device is installed.

Yet a further object of the invention is to provide an adjustable support for a net retrieving device wherein a minimum of hydraulic fluid hoses are exposed, which not only improves the overall appearance of the invention, but minimizes the possibility of the hoses being damaged in operation.

A still further object of the invention is to provide a support that can be horizontally positioned relative to the boat guards to permit raising and lowering of the boat by davits.

These and other objects and advantages of the invention will become apparent from the following description of the invention and from the accompanying drawings, in which:

Figure 1 is a side perspective view of an open boat in which the adjustable power operated support for a net handling device is installed;

Figure 2 is a perspective view of the adjustable support showing a net retrieving device mounted on the outer extremity thereof;

Figure 3 is a fragmentary cross-sectional view of the support taken on line 3—3 of Figure 2;

Figure 4 is a fragmentary vertical cross-sectional view of the support taken on line 4—4 of Figure 3;

Figure 5 is a partial top plan view of the device taken on line 5—5 of Figure 2;

Figure 6 is a partial top plan view and cross-sectional view of a portion of the device taken on line 6—6 of Figure 2;

Figure 7 is a vertical cross-sectional view of the jib plate and preferred form of lateral movement restraining support for the device;

Figure 8 is a vertical cross-section of a modification of the structure shown in Figure 7; and Figure 9 is an end view of the vessel showing the manner in which the preferred or first alternate form of lateral movement restraining support permits angular positioning of the net retrieving device when the net is being drawn from a position out of alignment with the retrieving portion thereof.

Referring to the drawings for the general arrangement of the power operated support, it will be seen in Figure 2 that it includes an always horizontal supporting plate or jib A which is pivotally mounted on a constant radius boom B. The lower extremity of boom B is pivotally supported from a housing C that is affixed to the lower portion of an upright hydraulic reservoir D of circular cross section, which also serves as a topping post. Linkage E is provided that is pivotally connected to an arm A' extending outwardly from plate A and reservoir D, and maintains the plate in a horizontal position at all times. The external diameter of reservoir D is such that the lower portion thereof is slidably, removably and rotatably mounted within the upper confines of a vertical tubular king post F that is affixed by a flange F' or other means to a convenient position aboard the vessel G. Reservoir D is rotatably and removably supported at a fixed elevation in king post F by the means shown in Figure 4, which will hereinafter be described in detail.

A ring gear H, or other rigid circular toothed member, is rigidly supported from the upper exterior portion of king post F and engaged by a worm gear J that is rotatably supported from housing C (Figure 3). Worm gear J is preferably actuated by a hydraulic motor K, as also shown in Figure 3. The motor K is supported from the boom B at a convenient location thereon. When the worm gear J is rotated by actuation of motor K, the boom B, of course, rotates relative to the king post F, whereby the boom can be caused to rotate through a full 360° in a horizontal plane.

A hydraulic cylinder L is provided that is pivotally connected to reservoir D. A piston rod M is associated with this cylinder L which projects outwardly therefrom and is pivotally attached to the outer extremity of boom B. Hydraulic fluid is withdrawn from reservoir D by a power operated pump (not shown) through a conduit N. Fluid is discharged under pressure from this pump through a conduit N' to manually operable valves which are identified as first, second and third valves Q, R and S, respectively. The first valve Q controls actuation of hydraulic cylinder L; the second valve R controls actuation of the motor K; and the third valve S controls actuation of a hydraulically driven net or line moving device T that is supported by and depends from plate A.

While the jib plate A is shown in Figures 2 and 5 of the drawings as oval in shape, it can be of any desired configuration. The net retrieving device T includes a frame 10 that rotatably supports a spool 12 and is preferably driven by the hydraulic motor 14. Spool 12 is of such configuration as to define a circumferentially extending space 16 of V-shaped transverse cross section between the two oppositely tapered faces thereof in which portions of the net U are continuously and sequentially compacted as it is drawn from the water to frictionally engage the spool 12 and lowered as a moving column U' aboard the vessel G where it is stacked in a desired location. Frictional contact of net U with spool 12 can be increased by providing ribs 18 on the net-contacting faces of the spool, with the major portions of these ribs being transversely positioned relative to the net section passing over the spool.

The preferred form of the lateral movement restraining support, as can best be seen in Figure 7, is provided by the cooperative action of an upwardly extending heavy bolt 22 that is affixed to a center portion 20 of the frame 10 and the jib plate A. In this preferred form, two inwardly and oppositely tapered, vertically aligned bores 24 and 24' are formed in plate A and communicate with a connecting bore 26, the transverse cross section of which is considerably larger than that of bolt 22. Two resilient pads 27 and 27' formed of rubber, or the like, are provided, and have conical faces that are complementary to the tapered surfaces of bores 24 and 24'. Bores 28 and 28' respectively extend longitudinally through pads 27 and 27', and are vertically alignable when the pads are disposed on plate A (Figure 7). Bores 28 and 28' are of such transverse section as to snugly engage bolt 22 when it is extended upwardly therethrough.

Two washer-shaped pressure plates 30 and 30' are provided that abut against the flat exterior faces of pads 27 and 27' respectively, and through which plates bolt 22 projects. Threads 32 are formed on the outer end portion of bolt 22 to permit engagement thereof by a nut 34. Frame portion 20 is larger in cross-sectional area than bolt 22 whereby a ring-shaped shoulder 36 is defined at the junction of portion 20 and bolt 22. Pressure plate 30' rests on shoulder 36 and abuts against pad 27'.

The weight of the net retrieving device T when supported from plate A, as shown in Figures 1 and 7, is transmitted through bolt 22, nut 34, and pressure plate 30 to compress pad 27. Tightening of nut 34 moves the bolt 22 upwardly relative to jib plate A, with pad 27' in turn being compressed and further compression of pad 27, to effect vertical positioning of the bolt 22 and device T. It will be particularly noted that the bolt 22, due to compression of pads 27 and 27', tends at all times to remain in a central position relative to bore 26 in spaced relationship therewith. However, if as it is drawn from the water the net U is at an angle relative to spool S, and the device T has not pivoted on bolt 22 to bring the net and spool into alignment, the resilient pads 27 and 27' and the greater cross-sectional area of bore 26 over that of bolt 22, permit the device T to assume the angular position shown in Figure 9.

The same result as outlined above can be achieved by use of the first alternate form of lateral movement restraining support shown in Figure 8. In this first alternate form a bore 40 of greater cross-sectional area than that of bolt 22 extends through plate A. Two ring-shaped resilient pads 27a and 27a' are substituted for pads 27 and 27' and serve the same function. The balance of the elements comprising the first alternate form of the support are the same as described in connection with the preferred form thereof, and are identified in Figure 8 by the same numerals used in describing and designating same in Figure 7. The first alternate form operates in the same manner as the preferred form and performs the same function.

Both the elevation and position of the jib plate A relative to vessel G can be varied at will, yet at all times it is maintained in a horizontal plane by the supporting mechanism, the detailed structure of which will be described hereinafter.

Boom B, as best seen in Figures 2 and 6, is preferably formed from two laterally spaced members 44 and 44' that are suitably cross-braced (not shown). Members 44 and 44' preferably taper outwardly toward one another, with the end portions thereof terminating adjacent to, and on opposite sides of the arm A'. Two rigid elongate links 46 and 46' are disposed on opposite sides of arm A', and between the arm and members 44 and 44'. Arm A', as well as the outer end portions of members 44, 44' and links 46, 46', have transversely positioned alignable bores formed therein through which a bolt 48, or other rigid elongate member, extends to pivotally join them together.

Transverse, alignable bores are formed in the end portions of links 46, 46' closest to reservoir D, as well as the end portion of piston rod 50 disposed therebetween, and a bolt or pin 52 extends through these bores. Piston rod M projects into the hydraulic cylinder L where it is rigidly affixed to a piston 54 that is slidably mounted therein. The rearward end portion of cylinder L has two laterally spaced lugs 56 projecting therefrom in which transverse aligned bores are formed, through which a bolt 58 extends. An upwardly extending rib 60 is welded or otherwise affixed to the upper end portion of reservoir D. A transverse bore is formed in rib 60 which rib is of such thickness as to permit it to be interposed between lugs 56. Bolt 58 also extends through the bore formed in rib 60 and serves to pivotally connect hydraulic cylinder L to reservoir D.

The tubular king post F is open at the top, and has a rigid ring-shaped flange 62 welded or otherwise rigidly affixed to the upper edge portion thereof. A ring gear 64 is provided that has a central opening therein of greater cross-sectional area than that of the reservoir. A number of circumferentially spaced bores are formed in gear 64 through which a number of bolts 66 extend downwardly to engage tapped openings formed in flange 62 to rigidly maintain the ring gear in place thereon. The teeth 64a of ring gear 64 are so cut that the profiles thereof extend upwardly and inwardly, as best shown in Figure 4.

A ring-shaped supporting plate 68 encircles reservoir D, and is rigidly affixed to, and at such a location on the exterior surface thereof that a substantial portion of the reservoir projects downwardly into the confines of the king post to slidably, rotatably and removably engage the interior surface of the post when the supporting plate 68 rotatably rests on the upper surface of gear 64. The housing C is rigidly affixed to supporting plate 68 by bolts 70 or other conventional means, and includes a downwardly extending side wall 72 sufficiently deep to cover those portions of teeth 64a with which a person might inadvertently come into contact or be thrown against due to unexpected motion of the vessel G. Side wall 72 of housing C extends approximately 180° of the circumference thereof and then develops into two bifurcated, laterally separated parallel arms 74 and 74'. Transverse, aligned bores are formed in arms 74, 74' in which two heavy tubular members 76 and 76' are rigidly disposed and held in position therein by bolts 78 or other fastening means that depend downwardly thereto through tapped vertical bores also formed in arms 74, 74', as clearly shown in Figure 3.

Tubular members 76 and 76' serve two functions; first, as bearings to rotatably support the end portions of a transversely disposed shaft 80, and second, as pivotal supports for boom members 44 and 44' by engaging bores formed in the inwardly disposed end portions thereof that extend into the bifurcated arms 74 and 74'. Worm gear J meshes with ring gear teeth 64a, and due to their curved configuration, can be readily separated therefrom when the reservoir is raised upwardly relative to king post F.

An endless chain belt 84 engages a sprocket 82 and extends to a driving sprocket 86 that is rotated when the motor K is hydraulically actuated, as explained hereinafter. Motor K is preferably mounted on a rigid cross piece 88 extending between, and affixed to the rearward portions of boom members 44 and 44'.

Horizontal stabilization of the jib plate A is achieved by the means E shown in Figure 2, and in greater structural detail in Figure 5. A transverse bore 90 is formed in the upper portion of arm A' through which a bolt or pin 92 extends that pivotally supports two rigid elongate members 94 and 94' positioned on opposite sides of the arm, and extending toward reservoir D. Elongate tubes 96 and 96' are rigidly affixed to the exterior faces of members 94 and 94' respectively, along the length thereof. Rigid hydraulic fluid conduits 98 and 98' are preferably attached to the outer ends of tubes 96 and 96' respectively, with these conduits leading to the net retrieving device T and terminating in couplings 100 and 100'. Flexible hoses 102 and 102' extend from couplings 100 and 100' respectively, to the discharge and suction sides of motor 14.

The ends of tubes 96, 96' adjacent the reservoir D are connected to two heavy, rigid tubular members or conduits 104, 104' through which hydraulic fluid can flow. The ends of conduits 104, 104' closest to reservoir D are connected to two hydraulic fitting assemblies 106, 106', each of which include a connector and T. Assemblies 106, 106' are welded or otherwise affixed to the exterior faces of two laterally spaced, parallel, rigid links 108, 108'. In the end portions of links 108, 108' adjacent reservoir D transverse aligned bores are formed through which a bolt or pin 110 projects. A lug 112 of such thickness as to permit insertion thereof between links 108, 108' is affixed to the exterior surface of reservoir D. A transverse bore is formed in lug 112 through which a bolt 110 extends and pivotally connects links 108, 108' to reservoir D.

The stabilizing assembly E above described is the same length between the bolts 92 and 110, as the length of the boom between bolt 48 and pivotal supports 76, 76'. Stabilizing assembly E is pivotally supported by arm A' and lug 112 in a position parallel to boom B, and as a result, when the boom is pivoted, the angular position of arm A' changes to at all times maintain the jib plate A in a horizontal position.

Valves Q, R and S (Figure 2) are provided with actuating handles 166, 168 and 170, and these valves are supported by conventional means from the exterior surface of reservoir D. A portion of a quick disconnect coupling 171 is mounted on a conduit N', with the balance of this coupling being affixed to a pipe 173 that extends to a fixed T 176 which is in fluid communication with a pressure gauge 174. T 176 is connected to a second T 172, one leg of which leads to valve Q to supply fluid under pressure to all three valves. T 172 is connected by a pipe 178 to a manually operable control valve 180, and when this valve is adjusted, fluid is supplied at the desired pressure to valves Q, R and S. Pipe 182 extends from valve 180 to the interior of reservoir D. A vertically disposed suction line 183 is situated in reservoir D and is connected to a valve 185, which in turn by means of a quick disconnect coupling 187 is joined to suction line N. Disconnection of couplings 171 and 187, as well as flange F' from its supporting structure, permits easy removal of the invention from the vessel on which it is installed. Reservoir D is preferably provided with a sight gauge 84 which visibly indicates the level of hydraulic fluid in the reservoir.

Two conduits 186 and 188 extend from valve Q to opposite ends of hydraulic cylinder L. By manually moving handle 166 to the first of two positions, hydraulic fluid from conduit N' is permitted to flow through conduit 186 to cylinder L and move piston rod M toward reservoir D to pivot boom B upwardly until the net retrieving device T is disposed in the desired position. Valve Q is of such construction that as fluid is discharged to cylinder L through conduit 186, fluid in the cylinder on the side opposite the piston 54 to which said discharge takes place, is displaced to flow through conduit 188 to reservoir D through a discharge line 189 connected to all three valves Q, R and S. When lever 166 is manually moved to the second of the two positions, the flow of fluid from conduit N' is reversed, and piston 54 is moved away from reservoir D to cause boom B to pivot downwardly and lower the net retrieving device T the desired distance. Unless handle 166 of valve Q is manually held in one of the two above mentioned positions, it automatically assumes a position wherein flow of fluid to, and flow of fluid out of conduits 186 and 188 is completely obstructed. Thus, the piston 54, rod M, and boom B are normally locked in a fixed position by the bodies of hydraulic fluid in cylinder L on each side of piston 54. Fluid discharged from the valves Q, R and S flows downwardly therefrom through a conduit 189 to the interior of reservoir D. To prevent foaming of the hydraulic fluid as it is discharged into reservoir D, extensions (not shown) of pipes 182 and 189 may be made inside the reservoir to terminate slightly above the bottom thereof in the same manner as pipe 183.

Valve R is of similar construction to valve Q and has two conduits 190 and 192 extending therefrom to hydraulic motor K. When handle 168 of valve R is manually placed in the first of two possible positions, fluid flows from conduit N' through conduit 190 to the motor. After passing through the motor the fluid is returned to reservoir D through conduit 192. When thus actuated, motor M rotates worm gear J to cause the reservoir D, boom B, and the net retrieving device T to rotate horizontally to the right. Moving handle 168 to the second of two possible positions causes a reverse flow of hydraulic fluid through conduits 190 and 192, and the worm gear is turned in an opposite direction to rotate boom B and the above-named associated components to the left.

Valve S is similar in construction to valve R, and has two conduits 194 and 196 extending therefrom to hydraulic assemblies 106 and 106', as best seen in Figure 5. Depending on the positioning of handle 168, hydraulic fluid can be discharged to motor 14 on the device T either through conduit 194, assembly 106, tubular member 104, tube 96, tubular member 98, coupling 100 and conduit 102, or through conduit 196, assembly 106', tubular member 104', assembly 106', tubular member 104', tube 96', tubular member 98', coupling 100' and conduit 102'. As hydraulic fluid is discharged to motor 14 by one of the routes above described, fluid is discharged from the motor through the other one of the routes to return to reservoir D through conduit 193.

Operation of the invention is extremely simple. King post F is bolted or otherwise rigidly secured to a selected supporting portion of the vessel G by means of the flange F'. Vessel G is provided with a source of hydraulic fluid under pressure (not shown) which is adapted to discharge the fluid through conduit N' and draw it from the reservoir D through conduit N. Conduits N and N' are simply and easily removed out of communication with reservoir D by use of quick disconnect couplings 171 and 187.

Placing the vessel G in commission for the fishing season or de-commissioning it at the end of the season is an extremely simple matter with respect to the present invention. When it is desired to place the vessel G in commission, the protective material such as canvas wrapping or the like, is removed from king post F, with the boom B, net retrieving device T, and all accessories shown in Figure 2 in assembled condition are brought to the vessel. The lower portion of the reservoir is then slid into the upper portion of king post F. Worm gear J meshes with ring gear 64 as the lower portion of reservoir D moves downwardly into the king post due to the weight of the assembly supported from the reservoir, until further downward movement of the reservoir is prevented when plate 68 contacts the upper surface of gear 64. Coupling 171 is then connected to conduit N', and coupling 187 to conduit N. The invention is then ready for use and in condition to be actuated as previously described by hydraulic fluid under pressure supplied through conduit N'. At the end of the fishing season the vessel G can be taken out of commission by simply reversing the above operation. It will be particularly noted that no tools are required in order to place the present invention in an operative condition or to dismantle same.

A particular operational advantage achieved by means of the worm gear J and ring gear 64 as shown in Figures 3 and 4, is that cooperatively they not only permit ready installation and removal of the invention from the king post F without the use of tools, but in addition the gear engagement is such that the reservoir D is locked against rotation about its longitudinal axis, except when worm gear J is driven by motor K to cause such rotation. Automatic locking of reservoir D and supported boom B in a king post F is of major importance when it is considered that the invention will be used in a sea-going vessel which is subject to violent pitching to the port or starboard when in rough waters. Obviously, any sudden swinging movement of the boom B and supported net retrieving device T could be extremely dangerous to crew members.

Although my invention is fully capable of achieving the results and providing the advantages hereinbefore mentioned, it is to be understood that it is merely the preferred embodiments thereof, and that I do not mean to be limited to the details of construction above described other than as defined in the appended claims.

I claim:

1. An apparatus adapted to be used by only one operator for sequentially raising consecutive sections of a net from the sea to a selected fixed position of desired elevation above a boat, which boat may have no superstructure but is provided with a source of hydraulic fluid under pressure, and from which fixed position said elevated net sections move downwardly at a desired rate of speed onto a supporting portion of said boat, which includes: rotatable power-driven net-engaging means; a frame that rotatably supports said net-engaging means; a pin rigidly affixed to the upper extremity of said frame and extending upwardly therefrom, said pin being vertically disposed when said frame and rotatable means are disposed in a position to raise said net; a tubular king post affixed to said boat, the longitudinal axis of said post being vertical when said boat on which said post is mounted is floating in an undisturbed position; a jib plate formed with a bore of larger cross-sectional area than the transverse cross-sectional area of said pin, said bore being parallel to said longitudinal axis; means that engage the upwardly projecting portion of said pin to support said frame, rotatable means, and pin from said jib plate; a boom; first pivotal means that pivotally support said jib plate from an end portion of said boom that is elevated relative to said boat; a hollow tubular body that serves both as a hydraulic reservoir and topping post, said tubular body being of such length as to have an upper portion thereof projecting from said king post when the balance of said tubular body therebelow is slidably and rotatably supported in said king post; engageable and engaging means disposed on said king post and tubular body, respectively, that removably interlock so that, when said engaging means is moved, rotational movement of said hollow body relative to said king post occurs; second pivotal means that pivotally support a lower end of said boom from said tubular body; stabilizing means pivotally connected to said jib plate and tubular body which at all times maintains said jib plate in a position where said upper surface thereof is normal to said longitudinal axis of said king post, as said boom and plate are pivoted in a vertical plane or pivoted horizontally about said longitudinal axis of said king post; first hydraulically operated means extending between said boom and tubular body and pivotally connected thereto, and when actuated pivoting said boom in a plane parallel with said longitudinal axis and extending therethrough; second hydraulically operated means supported at a fixed position relative to said tubular body which when actuated move said engageable means; first manually operable valve means which selectively permit said first or second hydraulically operated means to have hydraulic fluid under pressure discharged thereto to actuate same; second manually operable means that control the rate of rotation of said power-driven net-retrieving device, said first and second operable means being disposed sufficiently close to one another as to be usable by a single operator while remaining in a fixed position; conduit means connecting said source of hydraulic fluid under pressure to said valve means, said first and second hydraulically operated means and said reservoir; and stabilizing means cooperating with both said frame-supporting pin and jib plate to maintain said frame-supporting pin at all times parallel to said longitudinal axis to minimize sidewise movement of said frame and net-engaging means as said boat rolls, and substantially eliminate the possibility of said frame or net engaging means forcibly contacting said boom with resultant damage, as well as personnel on said boat being inadvertently struck with resultant injuries due to movement of said frame and net-engaging means relative to said jib plate.

2. An apparatus as defined in claim 1 in which said frame-supporting pin is formed with an upper threaded end portion and wherein said means which engage said pin is a nut which engages said threaded end portion, and said means which tend to maintain said frame-supporting pin parallel to said longitudinal axis are two compressed resilient pads through which said frame-supporting pin extends, the first of said pads disposed between said nut and the upper surface of said jib plate, and the second of said pads between the lower surface of said jib plate and a rigid surface portion of said frame.

3. An apparatus as defined in claim 1 in which the upper and lower portions of said bore in said jib plate are of conical configuration and taper outwardly from one another in opposite directions, said frame-supporting pin being formed with an upper threaded end portion and wherein, said means which engage said frame-supporting pin is a nut which engages said threaded end portion, and said means which tend to maintain said frame-supporting pin parallel to said longitudinal axis are two compressed resilient pads having tapered end surface portions complementary to said conical shaped bore portions and disposed therein, said pads formed with longitudinally extending bores through which said pin extends, with the first of said pads disposed between said nut and the upper surface of said jib plate, and the second of said pads between the lower surface of said jib plate and a surface portion of said frame.

4. An apparatus as defined in claim 1 in which said jib plate is provided with a rigid arm, at least a portion of said arm extending upwardly from said plate, said arm formed with a transversely disposed bore therein, said first pivotal means being a pin that extends through said bore in said arm and a transverse opening formed in the outer end portion of said boom, with said engageable means being a ring gear affixed to the upper end portion of said king post, and said engaging means being a worm gear rotatably supported at a fixed position relative to said tubular body.

5. An apparatus as defined in claim 1 in which a housing is provided that is affixed to an intermediately disposed circumferentially extending exterior surface portion of said tubular body, said housing defining a flat horizontal ring-shaped portion that rotatably rests on the upper surface of said ring gear to removably support said tubular body at a fixed elevation relative to said king post, said housing including side walls which extend downwardly therefrom over said ring gear, and said housing supporting said second pivotal means.

6. An apparatus as defined in claim 5 in which said housing includes two laterally spaced parallel arms that extend in the same direction as said boom, with a transversely disposed shaft being provided which is rotatably supported between said arms and has said worm gear rigidly affixed at an intermediately disposed position thereon, and said second pivotal means being said worm gear supporting shaft.

7. An apparatus as defined in claim 5 in which said boom includes two elongate laterally spaced cross-braced members which have transversely aligned bores formed in the lower portions thereof, with said arms each forming a bifurcated structure, said bifurcated arms having transversely aligned bores formed therein in which said worm gear supporting shaft is rotatably supported, and said second pivotal means being the sections of said worm gear supporting shaft within the confines of said bifurcated arms, said shaft sections pivotally engaged by said bores in said lower boom member portions, with each of said bifurcated arms serving to prevent any appreciable lateral movement of said boom relative to said housing.

8. An apparatus as defined in claim 5 in which said second hydraulically operated means is a hydraulically operated motor mounted on said boom; a driving sprocket capable of being rotated by said motor; an endless link belt; and a driven sprocket rigidly affixed to said worm gear supporting shaft, said driven and driving sprockets being connected by said belt with said hydraulically operated motor when actuated rotating said worm gear in either of two possible directions, to pivot said boom, body and housing about said longitudinal axis to a desired position relative to said boat, with said worm gear when said motor is not actuated serving as a brake to prevent pivotal movement of said body and boom relative to said supporting king post.

9. An apparatus as defined in claim 5 in which said first hydraulically operated means is a hydraulic cylinder pivotally connected to said tubular body; a piston slidably mounted in said cylinder; a piston rod connected to said piston and extending forwardly to two laterally spaced, parallel links which are pivotally connected on their rear ends to said rod, and are formed with transversely aligned bores on the forward end thereof that pivotally engage said pin extending through said bores in said boom and in said arm of said jib plate.

10. An apparatus as defined in claim 1 in which a hydraulically operated means is provided which actuates said rotatable net-engaging means and is mounted on said frame, and said stabilizing means are rigid tubular members having a portion of said conduit means connected to the lower ends thereof and to said valve means, and wherein another portion of each of said conduits is connected to the upper portions of said tubular members and to said hydraulically operated means on said frame, said second manually operated means being a hydraulic fluid-flow rate controlling valve which controls the rate of fluid discharge from said source through said conduit portions and tubular members to said hydraulic motor.

References Cited in the file of this patent
UNITED STATES PATENTS

| | | |
|---|---|---|
| 1,515,783 | Luce | Nov. 18, 1924 |
| 2,082,017 | McClain | June 1, 1937 |
| 2,594,076 | Schlein | Apr. 22, 1952 |
| 2,733,531 | Puretic | Feb. 7, 1956 |
| 2,774,483 | Raymond | Dec. 18, 1956 |
| 2,785,807 | Prowinsky | Mar. 19, 1957 |
| 2,810,980 | Puretic | Oct. 29, 1957 |